Patented May 12, 1936

2,040,093

UNITED STATES PATENT OFFICE 2,040,093

NONALKALI METAL SALTS OF DICARBOXYLIC ACID ESTERS OF CELLULOSE

Carl J. Malm and Charles R. Fordyce, Rochester, N. Y., assignors to Eastman Kodak Company, Rochester, N. Y., a corporation of New York No Drawing. Application July 30, 1932,
Serial No. 627,148

10 Claims. (Cl. 260—101)

The present invention relates to the non-alkali metal salts of dicarboxylic acid esters of cellulose, and their preparation.

The preparation of the dicarboxylic acid esters of cellulose is disclosed in Malm and Waring application Serial No. 380,252, filed July 22, 1929. That application discloses also the preparation of the alkali metal salts of those esters but the preparation of the non-alkali metal salts is not disclosed therein specifically.

We have found that the non-alkali metal salts of the dicarboxylic acid esters of cellulose may be prepared by reacting with a water-soluble salt of the metal upon an alkali metal salt of a dicarboxylic acid ester of cellulose such as is disclosed in the Malm and Waring application above referred to. We have found that if an aqueous solution of a non-alkali metal salt is added to an aqueous solution of a salt of a dicarboxylic acid ester of cellulose the non-alkali metal salt of the cellulose ester is formed by replacement of the alkali by the non-alkali metal and precipitates out from the reaction mixture. We have found that many of the non-alkali metal salts of cellulose dicarboxylic acid esters may be coated out from suitable solvents into clear, transparent sheets, which sheets in the case of the colored esters are correspondingly colored.

Our process broadly comprises the addition of an aqueous solution of a water-soluble salt of a non-alkali metal to an aqueous solution of the alkali metal salt of a cellulose dicarboxylic acid ester. The following examples illustrate the manner in which our invention may be carried out with representative non-alkali metal salts.

*Example 1.*—A solution of eleven pounds of calcium chloride in fifty pounds of water was added to two hundred fifty pounds of a 10% aqueous solution of cellulose acetate potassium phthalate (35% phthalyl). A spongy precipitate of cellulose acetate calcium phthalate was formed but due to its nature it could not be filtered off. To separate it from the reaction mass it was poured with stirring into about five hundred pounds of methyl alcohol. The precipitate formed was washed with methyl alcohol until free from calcium chloride and dried. The product was a white powder, soluble in water.

*Example 2.*—A solution of fifteen pounds of cobalt sulphate in fifty pounds of water was added to two hundred fifty pounds of a 10% aqueous solution of cellulose acetate potassium phthalate (35% phthalyl). The cellulose acetate cobalt phthalate formed, precipitated out. This precipitate was filtered off, and washed with methyl alcohol until free from cobalt sulfate. The product was dried and was found to be a blue solid which dissolved in warm water to give a colorless solution which set to a jell when cooled to room temperature.

*Example 3.*—By a procedure similar to the previous one, two hundred fifty pounds of a 10% aqueous solution of cellulose acetate potassium phthalate of 35% phthalyl was mixed with a solution of fourteen pounds of zinc chloride in fifty pounds of water. The precipitate formed was filtered off, washed with a 10% sodium chloride solution and dried. The cellulose acetate zinc phthalate resulting was found to be slightly soluble in water.

*Example 4.*—A solution of twenty-seven pounds of ferric chloride in fifty pounds of water was added to two hundred fifty pounds of a 10% aqueous solution of cellulose acetate potassium phthalate of 35% phthalyl content. The precipitate formed was washed with hot water and dried. The resulting cellulose acetate iron phthalate was found to be insoluble in water and organic solvents. It could however be dissolved in water to which a weak organic base was added.

*Example 5.*—A solution of twenty-five pounds of copper sulphate in fifty pounds of water was added to two hundred fifty pounds of a 10% aqueous solution of cellulose acetate potassium phthalate of 35% phthalyl content. A light blue precipitate formed which was washed with hot water until free from soluble copper salt and then dried. The resulting cellulose acetate copper phthalate was a blue solid insoluble in water or organic solvents. It could be dissolved by adding organic bases or ammonia to the material suspended in water. These solutions upon evaporation produced clear, transparent films which were blue or green the color depending upon the base used.

*Example 6.*—In a dark-colored container was placed two hundred fifty pounds of a 10% aqueous solution of cellulose acetate potassium phthalate of 35% phthalyl content. A solution of fifteen pounds of silver nitrate in fifty pounds of water was added thereto. The mixture was well stirred with exclusion of light and the precipitate formed was allowed to settle and was filtered off in dim light, washed free from silver nitrate and dried. The resulting cellulose acetate silver phthalate was insoluble in water or organic solvents.

Salts such as those above, which are soluble in suitable solvents, may be coated out into clear, transparent film. For example, the calcium salt may be coated out from water or water containing a small amount of methyl alcohol, while the iron, copper, silver, cobalt and zinc salts do not dissolve to give water solutions which may be coated even though the cobalt and zinc salts show slight solubility. These insoluble metal salts however may be carried into solution by certain weak bases from which solution they may be coated out to form sheets or skins. For example, a suspension of the iron salt shows no tendency to dissolve in water but upon addition of a small amount of ethylene diamine or triethanolamine a uniform quite viscous reddish brown solution is formed. The other metallic salts behave in a similar manner. In the case of colored salts different bases added to the solution sometimes will produce different colors. These solutions may then be coated into transparent film, colored solutions giving correspondingly colored skin or film. Any weak bases may be used to carry the insoluble salts into solution provided they are not strong enough to precipitate the metal as an oxide or hydroxide. Ammonia, for instance, is not suitable for dissolving the iron salt of cellulose acetate phthalate since hydrolysis occurs and iron oxide is precipitated. With copper, however, this base is quite satisfactory since ammonia does not precipitate an oxide of copper. In general, bases which form complex ions with a metal will serve to dissolve the cellulose acetate phthalate salt of that metal in water.

In the above examples cellulose acetate potassium phthalate is employed as the starting material as that is considered a representative example of an alkali metal salt of a dicarboxylic acid ester of cellulose. However, other water-soluble alkali-metal salts of dicarboxylic acid esters of cellulose such as cellulose sodium phthalate, cellulose acetate sodium phthalate, cellulose sodium succinate, cellulose acetate sodium succinate, cellulose potassium succinate or the like described in the above Malm and Waring application and Malm and Waring application Serial No. 627,149, filed of even date may be employed as the starting material. Any metal may be employed in preparing salts according to the present invention provided the water-soluble inorganic salt thereof will form with the cellulose ester a salt which is insoluble in water or at least insoluble in water containing an excess of the inorganic salt. For example, the water-soluble salts of the metals of the copper group of group 1 of the periodic table and the water-soluble salts of all the metals in groups 2 to 8 of the periodic table may be employed in our process so that the cellulose dicarboxylic salts of those metals may be prepared in accordance with this invention.

We claim as our invention:

1. A cellulose acetate copper dicarboxylate.
2. A cellulose acetate cobalt dicarboxylate.
3. A cellulose acetate silver dicarboxylate.
4. A cellulose acetate silver phthalate.
5. The process of preparing a non-alkali metal salt of a dicarboxylic acid ester of cellulose which comprises reacting upon an alkali-metal salt of the ester with a water-soluble salt of the non-alkali metal.
6. The process of preparing a non-alkali metal salt of a cellulose acetate dicarboxylate which comprises reacting upon an alkali metal salt of the cellulose acetate dicarboxylate with a water-soluble salt of the non-alkali metal.
7. The process of preparing a non-alkali metal salt of a cellulose acetate phthalate which comprises reacting upon an alkali metal salt of the cellulose acetate phthalate with a water-soluble salt of the non-alkali metal.
8. The process of preparing a silver salt of a dicarboxylic acid ester of cellulose which comprises reacting upon an alkali-metal salt of the ester with a water-soluble silver compound.
9. A compound represented by the following formula

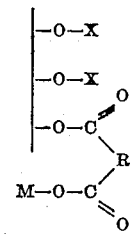

in which R represents an aliphatic or aromatic hydrocarbon group,

represents a $C_6$ unit of cellulose, M represents a metal belonging to the copper group of group I or to groups II-VIII of the periodic table and X represents H, acyl, alkyl or

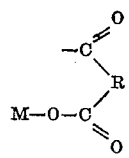

10. A compound represented by the following formula:

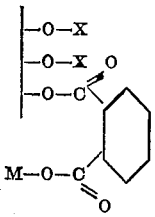

in which

represents a $C_6$ unit of cellulose, M represents a metal belonging to the copper group of group I or to groups II-VIII of the periodic table and X represents acetyl.

CARL J. MALM.
CHARLES R. FORDYCE.